I. D. SHAW.
BALL AND SOCKET JOINT.
APPLICATION FILED AUG. 13, 1921.

1,428,715. Patented Sept. 12, 1922.

INVENTOR:
Ira D. Shaw
By
ATTORNEYS:

Patented Sept. 12, 1922.

1,428,715

UNITED STATES PATENT OFFICE.

IRA D. SHAW, OF BOSTON, MASSACHUSETTS.

BALL-AND-SOCKET JOINT.

Application filed August 13, 1921. Serial No. 492,045.

*To all whom it may concern:*

Be it known that I, IRA D. SHAW, of Boston, in the county of Suffolk and State of Massachusetts, a citizen of the United States, have invented a new and useful Improvement in Ball-and-Socket Joints, of which the following is a full, clear, and exact description, reference being had to the accompanying drawings, forming a part of this specification, in explaining its nature.

The present invention relates to a ball and socket joint in which the ball of the ball member is socketed to turn between bearings contained within the socket member.

The essential object of my invention is to locate the ball within the socket member against possibility of accidental displacement.

It is a further object of my invention to provide means whereby the joint may be oiled from one end of the casing upon depressing one of the bearings retaining the ball.

The invention can best be seen and understood by reference to the drawings, in which—

Referring to the drawings:—

Figure 1:
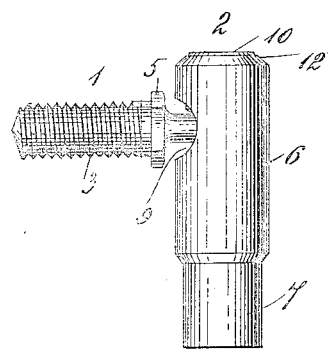
Figure 1 shows the improved joint in side elevation.
Figure 2:
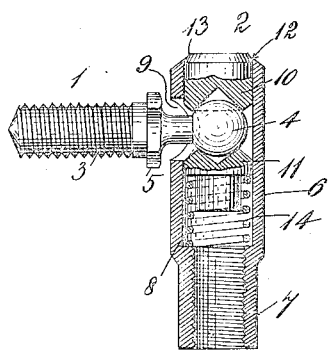
Figure 2 shows the ball member in side elevation and the socket member and contained parts in section.
Figure 3:
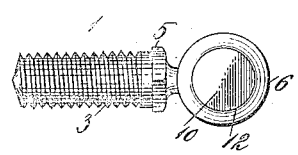
Fig. 3 is a plan of the joint.
Figure 4:
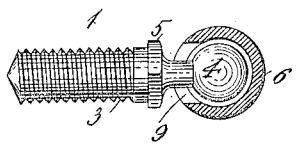
Fig. 4 is a plan of the ball member with the socket member in section.

The joint consists of ball and socket members 1 and 2, respectively.

The ball member comprises an externally threaded attachable shank portion 3 carrying a ball 4. The member is also provided with a shoulder 5 by which the member may be turned.

The socket member 2 comprises a hollow casing 6 provided with a contracted internally threaded attachable end portion 7. The portion of the casing thus contracted leaves a shoulder 8 within the casing. The casing is provided on one side with an opening 9 through which the ball is inserted to lie within the casing. When thus contained the ball is socketed to turn between bearings 10 and 11, respectively, located within the casing. Of these bearings the bearing 10 closes the end of the casing opposite the attachable portion 7 thereof and the bearing is held in place against outward displacement by a flange 12 inturned from off the end of the casing. In practice the outer end of the bearing is preferably provided with a beveled edge 13 and the flange 12 overlaps this edge. The bearing 11 is backed by a coiled spring 14 interposed between the bearing and the shoulder 8 within the casing. The tension of the spring acts to hold the bearing 11 in engagement with the ball and the ball in engagement with the bearing 10 retained by the flange as aforesaid.

Thus contained the ball is retained against possibility of accidental displacement. In this connection I prefer that when the bearing 10 is engaging the flange 12 it shall have such extension inside the casing that the ball cannot be withdrawn outwardly by it through the opening 9, even though the bearing 11 be depressed through downward pressure applied to the ball.

With the above construction the joint may be readily lubricated from the end of the casing upon depressing the bearing 10, all the contained parts yielding to such pressure through contraction of the spring 14. When the bearing 10 is thus depressed oil deposited in the cup thus left in the head of the casing will flow downwardly around the bearing between it and the wall of the casing in sufficient quantity to lubricate the joint.

Having thus fully described my invention, I claim and desire to secure by Letters Patent of the United States:—

1. In a ball and socket joint, a ball member comprising an attachable shank, a ball carried by it, a socket member comprising an attachable casing having a side opening in it through which the ball is inserted to become socketed within the casing, and bearings oppositely arranged within the casing between which the ball is socketed to turn, a flange inturned from off the end of said casing retaining one of said bearings and a spring within the casing engaging the other of said bearings for holding it in engagement with the ball and the ball in engagement with the bearing retained by the flange as aforesaid.

2. In a ball and socket joint, a ball member comprising an attachable shank, a ball carried by it, a socket member comprising an attachable casing having a side opening in it through which the ball is inserted to become socketed within the casing, and bearings oppositely arranged and movable within the casing between which said ball is socketed to turn, a flange inturned from off the end of said casing for retaining one of said bearings against outward displacement and a spring within the casing engaging the other of said bearings for holding it in engagement with said ball and said ball in engagement with that one of said bearings retained by the flange as aforesaid.

IRA D. SHAW.